United States Patent [19]

Segarra

[11] Patent Number: 4,661,951
[45] Date of Patent: Apr. 28, 1987

[54] COMMUNICATION NETWORK IN WHICH AT LEAST ONE STATION COMPRISES A DETERMINATION-TYPE MESSAGE FILTERING DEVICE

[75] Inventor: Gérard Segarra, Jossigny, France

[73] Assignee: U.S. Philips Corporation, New York, N.Y.

[21] Appl. No.: 689,887

[22] Filed: Jan. 9, 1985

[30] Foreign Application Priority Data

Jan. 13, 1984 [FR] France ............................ 84 00504

[51] Int. Cl.$^4$ ............................ H04J 3/02; H04J 3/16
[52] U.S. Cl. ...................................... 370/85; 370/86; 370/95; 370/89
[58] Field of Search ................ 370/85, 86, 89, 94, 370/60, 92, 95

[56] References Cited

U.S. PATENT DOCUMENTS 3,787,627  1/1974  Abramson et al. ................ 370/89
4,002,842  1/1977  Meyr et al. ........................ 370/86

Primary Examiner—Robert L. Griffin
Assistant Examiner—Wellington Chin
Attorney, Agent, or Firm—William J. Streeter; Edward W. Goodman; Anne E. Barschall

[57] ABSTRACT

Device for determination-type filtering of messages at the input of a station is connected to a communication network. A preferred embodiment of the device comprises a read/write memory which can be addressed by its contents (CA-EQ) and which comprises "n" rows for patterns, "n−1" of which can be modified under the control of the upper layer of the architecture; the free rows are managed by means of a FIFO-type buffer having "n−1" positions.

12 Claims, 4 Drawing Figures

COMMUNICATION NETWORK IN WHICH AT LEAST ONE STATION COMPRISES A DETERMINATION-TYPE MESSAGE FILTERING DEVICE

BACKGROUND OF THE INVENTION

The invention relates to a communication network comprising several stations, at least one station being provided with a data processing unit and a receiver module for receiving the frames transmitted via the network, the receiver module comprising an electronic determination-type filtering device for filtering the frames, each frame comprising at least a header, the filtering device comprising a localizing device for localizing a group of bits in a received frame, the filtering device also comprising an identification unit which is connected between an output of the localizing device and a first input of the data processing unit, the identification unit comprising a memory and a comparator for identifying the frames destined for the station by comparing the contents of the group of bits localized in each frame with at least one reference value stored in the memory and by forming a result signal for each frame when this group exhibits the necessary correspondence with the reference value, the data processing unit being provided for receiving the frames validated on beforehand in function of the result signal.

Such a network is known from the article "An introduction to local Area Networks" by D. D. Clark, K. T. Pogran and D. P. Reed, published in Proceedings of the IEEE, Vol. 66, No. 11, November 1978, pp. 1497-1517. The electronic filtering device enables the station to accept only those frames circulating in the network which are destined for this station. Therefore, in a frame received, the localizing device localizes either a part, for example the most significant bits, or the entire section formed by the address bits which are part of the header. The bits set apart among the address bits are then compared in the identification unit which comprises a comparator and a memory for this purpose. One or more reference values are stored in this memory. When the bits set apart among the address bits are equal to one of the reference values stored in the memory, the identification unit forms a result signal which is applied to the data processing unit. The formation of a result signal signifies that the frame received is destined for the station and the frame is thus accepted by the data processing unit under the control of the result signal. The station is thus constructed to determine which of the frames circulating in the network it will accept.

Nowadays, communication networks are well known and fully developed considering the progress made in the electronics technology.

One of the development trends leads to a sub-division and the distribution of the tasks, for example, in local area networks (LAN), switched networks (telephony) and the transmission in packets (TRANSPAC), be it private or public, satellite telecommunication networks.

The general term "broadcast network" is often used, this term means that all messages transmitted on the transmission carrier of the network by any system connected thereto are received by all systems connected. This mode of operation not only avoids complications concerning the physical routing of the messages (direct communications), but also facilitates, on the one hand, the implementation of communication systems between the logic entities and, on the other hand, the implementation of an efficient management system for the network, and also enables monitoring of the traffic from any point of the network.

However the flexibility offered by broadcast networks also has its drawbacks. The storage and processing capacity of each station is readily exceeded by the multitude of messages received, because the messages which are not intended for the station must also be examined by the electronic filtering device and the data processing system in order to ensure that they are only deliberately ignored.

Therefore, there are actually two types of filtering devices: one which corresponds to the physical addressing mode, where the station recognizes only a single physical address (a single address word stored in the first memory,) and one which corresponds to the logic addressing mode, where the station recognizes several logic addresses, for example, the subscribers to a service, or the participants in a telephone conference; all messages transmitted by each entity concerned contain the same logic number which is referred to as the logic address of the service or the telephone conference, and each station connected to the same logic number has to filter all messages thus addressed thereto in the broadcast mode; each station must be capable of simultaneously recognizing several logic numbers.

A drawback of known electronic filtering devices in a station which forms part of a communication network, consists in that the localizing device is only capable of localizing a well-defined part of the address bits of a frame; moreover, this well-defined part is the same for each frame received. Thus, the known localizing devices offer hardly any flexibility as regards the selection of the parts to be bounded in the address bits. Moreover, the memory of the identification unit is a read-only memory which means that it is impossible to modify, as the case may be, the contents of this memory for each frame. Due to these limitations, the filters now implemented at the level of the access control layer, perform only a probability-type filtering operation by means of standard components of the modulo-type (hash-coding) and the filtering thus performed, therefore, is not perfect and leads to undesirable overloading of the station, which in turn, may lead to the loss of the message or information when this logic addressing method is intensively used.

SUMMARY OF THE INVENTION

The object of the present invention is to mitigate these drawbacks by imparting a much higher flexibility to the electronic filtering device.

To this end, a communication network in accordance with the invention is characterized in that the localizing device comprises a second input which is connected to the data processing unit in order to receive a localizing signal which provides the positions of said group of bits, the memory being a memory which is programmable for each frame and which comprises a data input which is connected to a data output of the data processing unit for receiving at least one reference value. The first localizing signal supplies the localizing device with the positions to be detected among the bits of the frame and, because this first localizing signal can be supplied for each new frame, it enables the localizing device to localize other positions in each frame. Moreover, the programmable memory allows for, as the case may be, modification of its contents for each new frame.

Such a station can thus perform a determination-type selection of the messages it wishes to receive; this filtering operation is performed at the level of the electronic filtering device, thus avoiding undesirable overloading of the data processing unit; moreover, the same filtering device filters on the basis of logic addresses as well as on the basis of physical addresses, and on the basis of any other information contained in header, data field and trailer of any frame.

The advantage of the invention consists in that the filtering criteria used by the means as claimed herein are programmable under the control of the data processing unit of the station, allowing multiple applications such as, for example, the implementation of distributed electronic mailboxes which enables each declared user to receive letters (messages) with remote interrogation of the box by the user who moves arbitrary through the system, without having to worry about the routing in the network.

A first preferred embodiment of a communication network in accordance with the invention, wherein the frame comprises address bits, is characterized in that the localizing device is an address localizing device for localizing, among the address bits of each frame received, a group of bits whose position is given by the localizing signal, the identification unit being an address identification unit. Thus, a communication network station is obtained which is capable of setting apart various groups of bits among the address bits of each frame received, and of determining on the basis of these groups of bits, which frames are destined for the station.

A second preferred embodiment of a communication network in accordance with the invention, wherein the frame comprises data bits, is characterized in that the localizing device is a data localizing device for localizing, among the data bits of each frame received, a group of bits whose position is given by the localizing signal, the identification unit being a data identification unit. Thus, a communication network station is obtained which is capable of setting apart different groups of bits among the data bits of each frame received and of determining, on the basis of these groups of bits, which fields are destined for the station.

A third preferred embodiment of a communication network in accordance with the invention, wherein the frame comprises address bits and data bits, is characterized in that the localizing device comprises, on one hand, an address localizing device for localizing, among the address bits of each frame received, a group of bits whose position is given by a first localizing signal, and on the other hand, a data localizing device for localizing, among the data bits of each frame received, a group of bits whose position is given by a second localizing signal. The identification unit comprises an address identification unit for forming a first result signal and a data identification unit for forming a second result signal. The determination-type filtering device comprises a combinatory device which is connected to an output of the address identification unit and to an output of the data identification unit in order to receive the first result signal and the second result signal, respectively. The combinatory device forms a third result signal on the basis of first and second result signals, and a data processing unit is provided for receiving the frames validated beforehand under the control of the third result signal only. A communication network station is thus obtained which is capable of setting apart different groups of bits among the header as well as among the data bits of the frames received. The first and the second result signals are combined in the combinatory device in order to form a third result signal. The data processing unit will receive thus the frames selected according to the reference values that have been programmed by themselves.

Preferably, a communication network in accordance with the invention is characterized in that the combinatory device comprises an input which is connected to the data processing device in order to receive a control signal for controlling the logic combinatory mode to be applied to the first and the second result signals. The data processing unit can thus control the combinatory device and select the combination to be applied to the first and the second result signals in order to form the third result signal. These combinations are, for example logic AND, OR or other combinations.

Preferably, a communication network in accordance with the invention is characterized in that the comparator is a comparator of the type "larger than" and/or "smaller than" and/or "equality".

This device enables efficient management of the network by filtering, for example, only the messages which are despatched by the stations whose addresses and/or data are situated within a range of data values.

A further preferred embodiment of a communication network in accordance with the invention is characterized in that the memory of the identification unit is a memory which can be addressed by its contents. The use of a memory which can be addressed by its contents allows for integration of the memory in the comparator.

Preferably, a communication network in accordance with the invention is characterized in that the memory which can be addressed by its contents is a read-write memory, and that the identification unit comprises a management unit for managing, under command of the data processing unit, the content of each of the n lines of said memory. This simplifies the updating of the memory which can be addressed by its contents.

Preferably, a communication network in accordance with the invention is characterized in that the management unit comprises a buffer memory of the first-in-first-out (FIFO) type for managing the availability of the line numbers, the buffer only comprising n-1 positions. This enables that one line will maintain the initial value.

BRIEF DESCRIPTION OF THE DRAWINGS

The advantage offered by a communication network which comprises at least one station provided with an electronic determination-type filtering device in accordance with the invention will be better understood on the basis of the following description of a non-limitative example which will be given with reference to the accompanying drawings, in which.

DESCRIPTION OF THE PREFERRED EMBODIMENT

The invention is used in a communication network which comprises several stations. The various stations are not necessarily identical. For the invention it suffices that a single station is provided with the means described hereinafter.

Figure 1:
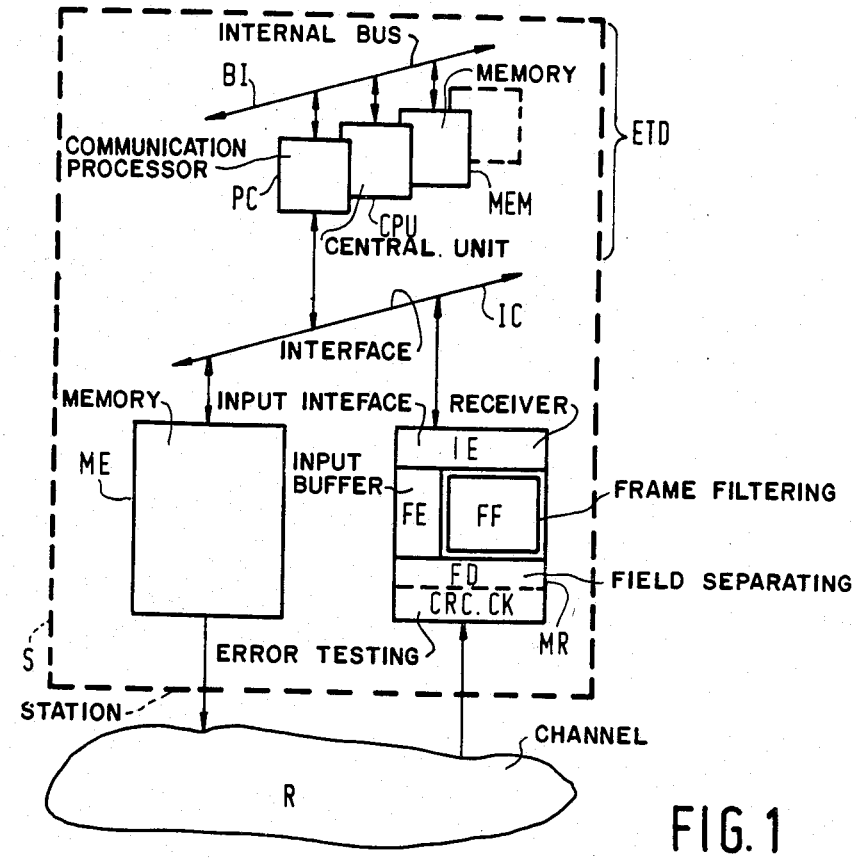
FIG. 1 shows the general architecture of a station connected to a network.

FIG. 1 shows a station (S) which forms part of a network and which is connected, via a transmitter module (ME) and a receiver module (MR) to a channel (R) in which the messages are transported; these two modules are connected to an interface (IC), also referred to as communication bus, for communication with the data processing unit (ETD); the data processing unit comprises in general a communication processor (PC), a central unit (CPU), a memory (MEM), which are linked by means of an internal bus (BI).

The receiver module (MR) serves to receive messages; it comprises inter alia an error testing device (CRC-CK), a frame separating device (FD), a frame filtering device (FF), a FIFO-type input buffer (FE) and an input interface (IE). Each frame comprises address bits and, eventually, data bits. Each frame received is tested by the error testing device (CRC.CK) and, if the test result is satisfactory, the determination-type or probability-type filtering device (FF) performs a filtering operation on the basis of the data supplied by the separating device (FD). The frame accepted after testing and filtering is stored in the input buffer (FE). At the request of the data processing unit (ETD), the frames stored are applied, one by one (FIFO procedure), to the communication bus (IC) via the input interface (IE).

When a known probability-type filtering operation (FF) is implemented, the input buffer may become quickly saturated and frames will thus be lost.

Figure 2:
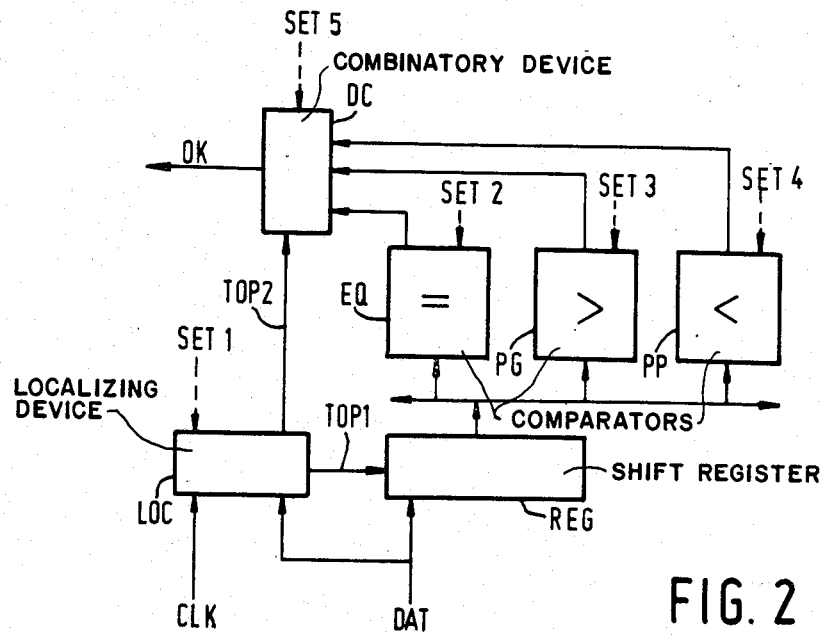
FIG. 2 shows a filtering device in accordance with the invention.

The filtering device (FF) in accordance with the invention will now be described with reference to FIG. 2 and serves to perform a determination-type filtering operation in order to prevent saturation of the input buffer.

Figure 4:
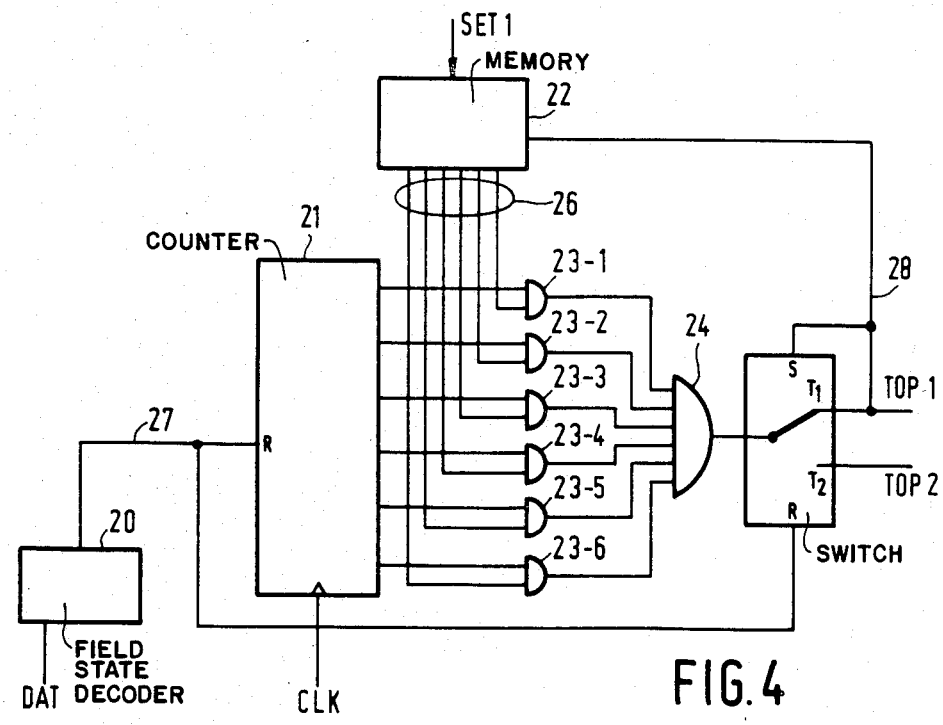
FIG. 4 shows an embodiment of a localizing device.

The clock information (CLK) and the bits (DAT) of the field arrive from the network with each field to be filtered; a localizing device (LOC), in the form of a bit counter, receives on the one hand, the clock information (CLK) and, on the other hand, the bits (DAT). FIG. 4 shows an exmple of such a localizing device which serves to enable the extraction of given zones of a message. The localizing device comprises a field-start decoder 20 which receives the bits DAT. As is indicated by its name, the decoder 20 decodes the beginning of a new frame from the bits DAT received. The construction of the decoder 20 is chosen as a function of the network protocol. For example, when the right to transmit is allocated via a token (token-ring bus), the decoder 20 decodes the presence of the token in the channel whereto the various stations are connected. When each field is enclosed by a start-and/or begin-of-message indication, the decoder is constructed so as to detect such an indication.

When the decoder has decoded the beginning of a new frame, it transmits a reset-to-zero signal on the line 27 which is connected to the reset-to-zero inputs of a counter 21 and a switch 25. This reset-to-zero signal sets the switch 25 to the position T1 and resets the counter 21 to zero. The counter 21 is a parallel output static binary counter which comprises a clock input which receives the clock signal (CLK).

It is assumed that the frequency of the clock signal equals the frequency of the data bits. After having been reset to zero, the counter 21 thus counts the pulses of the clock signal and permanently outputs its current value on its six parallel outputs. It will be apparent that this number of six outputs is merely given by way of example and that the invention is by no means restricted to this number. Each of the six parallel outputs of the counter is connected to a respective first input of a logic $\overline{XOR}$ (23-1, 23-2, 23-3, 23-4, 23-5, 23-6). A second input of each of the logic $\overline{XOR}$ is connected to an output of a memory 22 via a respective connection line which forms part of the set of connection lines 26. The output of each of the logic $\overline{XOR}$ 23 is connected to a respective input of a logic AND-gate 24 whose output is connected to an input of the switch 25.

Under the control of a first localizing signal, which is supplied by the data processing unit of the station (ETD), a first binary word (M1) and a second binary word (M2) (M2>M1) are loaded into the memory 22 which is formed, for example, by a buffer. After the loading of these words, the first word M1 is transmitted, via the connection lines 26, to the second inputs of the logic $\overline{XOR}$ 23. When the counter 21 has reached a first value which is equal to the value indicated by the first word M1, each of the logic $\overline{XOR}$ 23 outputs the logic value 1 which is then applied to the logic AND-gate 24. The appearance of a logic value 1 on each of the six inputs of the logic AND-gate 24 causes the appearance of a logic value 1 on the output of the logic AND-gate 24. Because (due to the reset-to-zero signal) the switch is in the position T1, the logic value 1 is applied to the line 28, thus forming a start signal TOP1 whose function will be described hereinafter.

The line 28 is connected to a control input of the switch 25.

The start signal TOP1, which is thus applied to this control input of the switch, sets the switch to the position T2. The line 28 is also connected to a control input of the memory 22 and the start signal TOP1 ensures that the second word M2 is applied to the logic $\overline{XOR}$ 23.

When the counter 21 reaches a second value which is equal to the value indicated by the second word M2, an arrival signal TOP2 is generated in the same manner as the start signal TOP1.

The signals TOP1 and TOP2 correspond to well-defined positions in the frame and, as already mentioned, the counter 21 counts the pulses of the clock signal which have the frequency of the data bits. The words M1 and M2 thus indicate well-defined positions within the frame, which positions are detected by the assembly formed by the counter 21, the memory 22 and the logic gates 23 and 24.

The signals TOP1 and TOP2 enable the filtering device to take into account only the part of the frame which is situated between well-defined positions. Because the memory 22 can be loaded, as the case may be, for each frame under the control (SET1) of the upper layer of the architecture, the boundaries of the part taken into account can thus be changed for each frame.

As the case may be, the memory 22 may also be formed by a table containing several binary words. The first positioning signal SET1, supplied under the control of the upper layer, then indicates the positions in the table where the words M1 and M2, representing the positions to be detected in the field, are stored.

In the filtering device described with reference to FIG. 2, the formation of the start signal TOP1 by the localizing device (LOC) corresponds to the presentation, among the bits (DAT) of the frame, of the first bit which forms part of a group of bits which forms the identification bits of a new frame. The start signal TOP1 is applied to a shift register (REG) which successively loads, under the control of the signal TOP1, the bits forming part of this group. The output of the register (REG) is connected to the comparators of the identification unit. In the example shown in FIG. 2 there are three comparators: an equality comparator (EQ), a "larger-than" comparator (PG) and a "smaller-than" comparator (PP). The comparators (EQ, PG and PP) are activated and set under the control of SET2, SET3 and SET4, respectively, from the data processing unity. The output of the comparators is connected to a respective input of a combinatory device (DC). The combinatory device (DC) is controllecd by a control signal (SETS) formed by the data processing unit.

When the register (REG) has received the start signal TOP1, it successively loads the bits (DAT) received on its data input. Thus, successive loading takes place of the bits which form part of a group of bits on the basis of which the identification of the frame is performed. The bits forming part of said the group are applied to the comparators in order to be compared therein with reference values which are stored in memories which form part of the comparators. These memories can be programmed for each frame via the instructions SET2, SET3 and SET4. Thus, using these instructions SET2, SET3 and SET4, the data processing unit on the one hand loads the reference values into the memories and on the other hand activates one or more of the comparators (EQ, PG, PP). The comparison of the group of bits localized in the frame by the localizing device (LOC) is thus performed by the comparator activated by the data processing unit. The result of this comparison is applied to the combinatory device (DC). When the combinatory device has received the signal TOP2 which indicates the end of the group of bits, it will logically combine all comparison results. When the group of bits exhibits the necessary correspondence with the reference value, the comparison results are positive and the combinatory device forms a result signal (OK). The decision to accept, formed by the result signal, is applied to the input interface (IE) in order to validate the storage of the frame after filtering.

The group of bits in the frame on which the identification if the frame is performed may be situated either among the data bits of the frame or among the address bits, as well as the address bits and the data bits. Therefore, the filtering device in accordance with the invention will comprise either an address localizing device and an address identification unit, or a data localizing device and a data identification unit, or both, in which case the same device performs the two filtering operations successively.

However, it will be apparent that the filtering device in accordance with the invention is not restricted to the example described with reference to FIG. 2 and that other embodiments are also feasible.

The comparators can thus perform the comparison either bit by bit, thus forming a result for each bit, or on the basis of the entire group, thus forming directly a result signal. In the latter case, the signal TOP2 is also applied to the comparator and the shift register and the loading of the group of bits into the comparators will be performed only under the control of the signal TOP2.

For example, when it receives one or more result signals from the comparators, the combinatory device (DC) may be provided for logically combining all result signals into a single result signal which is applied to the data processing unit. Thus, for example in the case where the acceptance of a frame is decided on the basis of a group of bits forming part of the address bits and a group of bits forming part of the data bits, the combinatory device will combine the two result signals in order to form a third result signal. To this end, the combinatory device is provided, for example, with logic AND-gates and OR-gates, the selection of one of these gates being determined by the instruction SETS.

Figure 3:
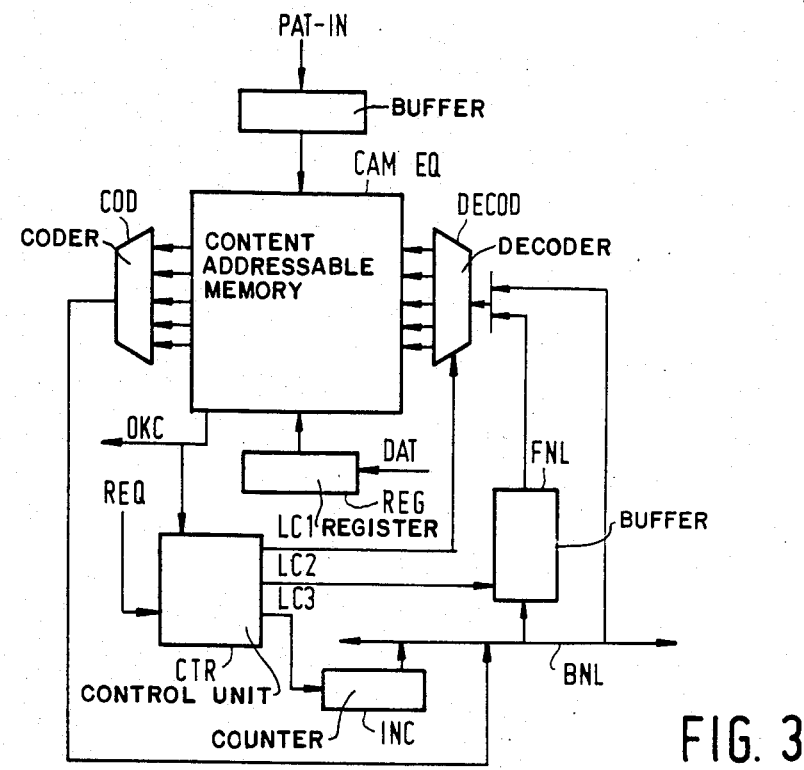
FIG. 3 shows a programmable filtering device.

A programmable filtering device in accordance with the invention with equality comparison as shown in FIG. 3 is particularly attractive. FIG. 3 shows only the equality comparator section (EQ) of FIG. 2, together with the control elements thereof.

The equality comparator shown in FIG. 3 is formed by a memory (CAM-EQ) which is addressable by its contents. Such a memory is described, for example in French Patent Application No. 24 12 140. As has already been described, the data (DAT) of a field are input via the register (REG) and if one of the values stored in the addressable memory (CAM-EQ) equals the identification bits of the field, the acceptance signal (OKC) is generated.

A description will now be given of the circuits and the initialization, updating, insertion and suppression of the values stored in the memory (CAM-EQ).

As has already been stated, the invention enables a determination-type filtering of the frames on the basis of the identification bits of the destination (destinations) of each frame and on the basis of the bits set apart in the frame. Each valid bit configuration for a station will be referred to as a "pattern"; at the level of its data processing equipment (ETD in FIG. 1). Each station knows on one hand the pattern to be inserted into each frame to be transmitted thereby and on the other hand the patterns of the frames it has to recognize. To this end, the memory (CAM-EQ) comprises a number of rows for storing the patterns to be recognized; the customary dimension of a pattern is 48 bits and a number of, for example 256 rows is customary for a station which is active in a network. Thus, the memory (CAM-EQ) comprises, for example 256 rows of 48 bits each, resulting in a storage capacity of 256 patterns; in networks it is often conventional that the pattern 'III.III', all bits "1", corresponds to the fields which are intended for all stations (general broadcast), which is why this value has been chosen as the initial value for all pattern rows of the programmable memory (CAM-EQ) which can be addressed by its contents.

The initialization device comprises a microprogrammed automatic control unit (CTR) for controlling notably a decoder (DECOD) via a first control line (LC1), a FIFO-type row number buffer (FNL) via a second control line (LC2), and a counter (INC) via a third control line (LC3); the counter (INC) supplies a row number to a row number bus (BNL) whereto there are connected on the one hand the buffer (FNL) and on the other hand the decoder (DECOD); the decoder (DECOD) activates the row of the memory (CAM-EQ) which corresonds to the row number it rceives either from the row number bus (BNL) or from the buffer (FNL).

Upon initialization, the default value of the pattern (all bits "1" as stated above) is introduced into the columns of the memory (CAM-EQ) by the connection (PAT-IN), the counter (INC) applies the value "0" to the decoder (DECOD) and the microprogrammed automatic control unit (CTR) activates the first control line (LC1) in order to control the writing of the pattern "all "1"" on the row "0" of the memory (CAM-EQ).

Subsequently, the counter (INC) is successively incremented "1" by "1" to the value 255 for initializing the entire 256 rows of the memory (CAM-EQ) to "1". At the same time the buffer (FNL) has also been initialized as follows: the buffer (FNL) is used for storing the numbers of the free rows of the memory (CAM-EQ); this buffer has a capacity of 255 row numbers because it has been found that it is very attractive that at a later stage only 255 rows of the memory (CAM-EQ) can be modified so that at least one row always retains the pattern "all "1""; thus, each row number written during the initialization is successively validated in the FIFO-type row number buffer (FNL) so that at the end of the initialization all row numbers from 1 to 255 are stored in the buffer (FNL), the number 1 being the first entry, followed by the number 2, . . . , up to the last number 255; in accordance with the FIFO principle, the first number output will be the number 1, followed by 2, etc.
. . .

After the initialization, the filtering device is ready for the storage, at random, of insertions or suppressions of patterns to be filtered; in both cases the data processing equipment (EDT in FIG. 1) supplies the relevant pattern, via the connection (PAT-IN), as well as the nature of the request (REQ) transmitted to the microprogrammed automatic control unit (CTR).

In the case of pattern suppression, the operating principle consists in that logic values "1" are inserted in the position of the pattern to be suppressed if the latter is effectively present; to this end, the pattern to be suppressed, supplied via the connection (PAT-IN) as described above, is examined by the memory (CAM-EQ) which responds by supplying the signal (OKC) if the pattern is effectively present. It is to be understood that this response (OKC) is not taken into account by the combinatory device (DC) which is inhibited during the requests (REQ). If the pattern to be suppressed is not present (OKC), the suppression operation cannot take place and the request is cancelled by the data processing unit. If the pattern to be suppressed is effectively present (OKC) in the memory (CAM-EQ), the coder (COD) determines the row number concerned and applies this number to the row number bus (BNL) whereto it is connected in the already described manner. At that instant the microprogrammed automatic control unit (CTR) outputs an instruction, via the line LC1, for writing the values "1", as during the initialization, on the row whose number is present on the bus (BNL); at the same time the number of the row concerned, which has thus become free for a new pattern, is stored, under the control of a signal on the line LC2, in the buffer (FNL) in exactly the same way as during the initialization described above; the suppression of the pattern is then terminated and a relevant signal can be applied to the upper layer via the input interface (IE in FIG. 1).

In the case of pattern insertion, the operating principle consists in the writing of this pattern into the memory (CAM-EQ) if on the one hand this pattern is not yet present, and on the other hand if there is an empty space available for this new pattern.

As has already been stated, the absence of the pattern to be inserted is verified by the response (OKC) of the memory (CAM-EQ).

However, the presence of an empty space is verified by the fact that the row number buffer (FNL) is not empty, which means that a row number is applied to the decoder (DECOD).

It will be remembered that a free row is a row "all "1"" other than the row number 0. At that instant the microprogrammed automatic control unit (CTR) produces an instruction for writing the pattern to be inserted on the row whose number is supplied by the buffer (FNL); at the same time, the row number which has just been used is suppressed in the buffer (FNL).

Summarizing, it can be said that the described determination-type programmable filtering device in accordance with the invention is conceived for filtering the frames transmitted via the network on the basis of patterns present in a memory (CAM-EQ) which can be addressed by its contents, the contents being constantly modifiable by the data processing equipment (ETD) of the station.

Due to its flexibility, the device in accordance with the invention can be used in numerous ways, notably in broadcast networks; in such a network an entity, for example a user, can declare itself in an arbitrary station "i", which is translated into the fact that the pattern of the entity is stored in a row of the memory (CAM-EQ) of the station "i"; all messages addressed to this entity will then be accepted by the filter in accordance with the invention in order to be stored by the station "i"; when the entity moves through the organization and declares itself again in another station "n", this station "n" will store the pattern of the entity in its own memory (CAM-EQ) and will interrogate (for example in the broadcast mode) the other stations in order to request these stations to transmit the messages destined for the declared entity to the station "n"; the station "i" will recognize the interrogation message and will respond thereto by suppressing the pattern of the entity in its own memory (CAM-EQ); this is a typical electronic mailbox application.

Another possibility is the monitoring of traffic in the network in order to improve the management of the network; for this purpose it is often necessary to "zoom in" on a particular section of the network; this corresponds to a selective filtering of the messages transmitted and/or received by given stations whose patterns are known; these known patterns can be stored in the memory (CAM-EQ) of the network monitoring station which will thus receive all messages concerning the relevant network section; for the same purpose it is also possible to monitor the traffic concerning all patterns comprised between two values "K" and "m" by utilizing said comparators "larger than" and "smaller than"; "K" and "m" may be either patterns of physical stations or logic patterns of known entities in the network; by using the programmable frame separating device (FD) as described above, "K" and "m" can at option be the pattern of the transmitter or the pattern of the destination, because both patterns are present in each frames. These examples provide a non-limitative idea of the possible applications of the invention.

What is claimed is:

1. A communication network comprising several stations, at least one station being provided with a data processing unit and a receiver module for receiving frames transmitted via the network, each frame comprising at least a header, said receiver module comprising an electronic determination type filtering device for filtering said frames, said filtering device comprising:

(a) a localizing device having one input for receiving said frames and other input connected to said data processing unit for receiving a localizing signal, said localizing signal indicating a portion of said frame to be analyzed for localizing a portion of at least one group of bits within said portion of said received frame;
(b) an identification unit which is connected between an output of said localizing device and an input of said data processing unit, said identification unit comprising:
  (1) a memory means which is programmable for each frame, said memory having a data input which is connected to said data processing unit for receiving at least one reference value; and
  (2) a comparator connected to said memory for comparing a content of said localized group of bits with said reference value stored in said memory and for forming a result signal when said group of bits within said frame corresponds to said reference value, said identification unit supplying said result signal to said data processing unit;
whereby said data processing unit receives the frames validated upon said result signal as designated for the station.

2. A communication network as claimed in claim 1 wherein said frame comprises address bits and wherein said localizing device is an address localizing device for localizing, among the address bits of each frame received, a group of bits within said portion of said frame indicated by said localizing signal, and wherein said identification unit is an address identification unit.

3. A communication network as claimed in claim 1 wherein said frame comprises data bits, wherein said localizing device is a data localizing device for localizing, among the data bits of each frame received, a group of bits within said portion of said frame indicated by said localizing signal, and wherein said identification unit is a data identification unit.

4. A communication network as claimed in claim 1 wherein said frame comprises both address and data bits, and wherein said localizing device comprises an address localizing device for localizing, among the address bits of each frame received, a group of bits within a portion of said frame indicated by a first localizing signal, and a data localizing device for localizing, among the data bits of deach frame received, a group of bits within a portion of said frame indicated by a second localizing signal, said identification unit comprising an address identification unit for forming a second result signal, and a combinatory device which is connected to an output of said address identification unit and to an output of the data identification unit for receiving said first and said second result signals, respectively, said combinatory device forming a third result signal by logically combining said first and second result signals, whereby said data processing unit receives the frames validated beforehand under control of third result signal only.

5. A communication network as claimed in claim 4, wherein said combinatory device has another input which is connected to said data processing device in order to receive a control signal to control said logical combination for comparing said first and said second result signals.

6. A communication network as claimed in claim 5, wherein said identification unit comprises a comparator of the larger than type for identifying a signal larger than a predetermined reference signal.

7. A communication network as claimed in claim 5, wherein said identification unit comprises a comparator of the smaller than type for identifying a signal smaller than a predetermined reference signal.

8. A communication network as claimed in claim 5, wherein said identification unit comprises a comparator of the equality type for identifying a signal equal to a predetermined reference signal.

9. A communication network as claimed in claim 8, wherein said memory of said identification unit is a memory which is addressed by its contents.

10. A communication network as claimed in claim 9, wherein said memory is a read-write memory, having n lines and wherein said identification unit comprises a management unit controlled by said data processing unit for managing the content of each of said n lines of said memory.

11. A communication network as claimed in claim 10, wherein said management unit comprises a buffer memory of the first-in-first-out (FIFO) type for managing the availability of the line numbers and said buffer comprises only n-1 positions.

12. An electronic filtering device for use in at least one station which forms part of a communication network as claimed in any of the preceding claims.

* * * * *